United States Patent
Han et al.

(10) Patent No.: US 7,590,865 B2
(45) Date of Patent: Sep. 15, 2009

(54) METHOD AND APPARATUS FOR RESTRICTION USE OF STORAGE MEDIUM USING USER KEY

(75) Inventors: Sung-hyu Han, Seoul (KR); Yun-sang Kim, Suwon-si (KR); Yang-lim Choi, Seongnam-si (KR); Yong-kuk You, Seoul (KR); Hoc-chul Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 656 days.

(21) Appl. No.: 10/953,579

(22) Filed: Sep. 30, 2004

(65) Prior Publication Data

US 2005/0259816 A1    Nov. 24, 2005

(30) Foreign Application Priority Data

Nov. 12, 2003    (KR) ..................... 10-2003-0079914

(51) Int. Cl.
*H04L 9/32*    (2006.01)
(52) U.S. Cl. ..................... 713/189; 713/193; 380/44; 380/46
(58) Field of Classification Search ................. 713/189, 713/193; 380/44, 46; 369/84
See application file for complete search history.

(56) References Cited

U.S. PATENT DOCUMENTS

| | | | | |
|---|---|---|---|---|
| 4,268,715 A * | 5/1981 | Atalla | .......................... | 705/75 |
| 4,757,534 A * | 7/1988 | Matyas et al. | .................. | 705/56 |
| 6,256,773 B1 * | 7/2001 | Bowman-Amuah | ......... | 717/121 |
| 6,272,631 B1 * | 8/2001 | Thomlinson et al. | ........ | 713/155 |
| 6,289,102 B1 * | 9/2001 | Ueda et al. | .................. | 380/201 |
| 7,065,579 B2 * | 6/2006 | Traversat et al. | ............ | 709/230 |
| 2002/0188566 A1 | 12/2002 | Inchalik et al. | | |
| 2005/0044083 A1 * | 2/2005 | Sako | .......................... | 707/100 |

FOREIGN PATENT DOCUMENTS

| | | |
|---|---|---|
| EP | 1 376 573 A2 | 1/2004 |
| GB | 2 362 749 A | 11/2001 |
| JP | 2001-256004 A | 9/2001 |

* cited by examiner

*Primary Examiner*—Hosuk Song
(74) *Attorney, Agent, or Firm*—Sughrue Mion, PLLC

(57) ABSTRACT

A method and apparatus for restricting the use of a disc are provided. In this method, first, lead-in data is read out from a loaded disc. Then, a user key is read out from a lead-in area of the disc. Thereafter, the user key undergoes authentication based on a user key received from a host. The authentication is performed by comparing a random number produced by a disc drive with a decrypted random number obtained by the disc drive decrypting a random number encrypted by the host. Accordingly, the use of the disc by an unauthorized third person is restricted, thus preventing a leakage of personal information and a protection of the copyrights of data.

9 Claims, 11 Drawing Sheets

| protect flag | | |
|---|---|---|
| SID | Content | Address |
| $S_1$ | $C_1$ | 0000~00FF |
| $S_2$ | $C_2$ | 0100~01FF |
| $S_3$ | $C_3$ | 0200~02FF |
| | | |

METHOD AND APPARATUS FOR RESTRICTION USE OF STORAGE MEDIUM USING USER KEY

BACKGROUND OF THE INVENTION

This application is based on and claims priority from Korean patent application Ser. No. 2003-79914, filed on Nov. 12, 2003, in the Korean Intellectual Property Office, the disclosure of which is incorporated herein in its entirety by reference.

FIELD OF THE INVENTION

The present invention relates to a method and apparatus for restricting the use of a disc by using a user key in order to prevent an access to the disc by an unauthorized third person.

DESCRIPTION OF THE RELATED ART

Optical discs, which are large-capacity recording media, have been recently developed. Well-known examples of the optical disc include compact discs (CDs), on which music data has been recorded, CD-ROMs, on which computer data has been recorded, digital versatile discs (DVDs), on which image data has been recorded, and so on.

Some contents, such as, video data and/or audio data that have been recorded on a data recording medium, must be copyrighted. The copyrights of these contents can be protected using encryption. In encryption, encrypted contents data, key information necessary for decrypting the encrypted contents data, and the like are used as control information. For example, a read-only optical disc stores not only encrypted contents data but also key information. When a reproducing apparatus reproduces data from the read-only optical disc, the reproducing apparatus first reproduces the key information and then decrypts the encrypted contents by using the key information.

A recent demand for security about personal contents of a user occurs in addition to the need for the copyright of some contents data. A user needs to set a user key for contents that the user recorded and protect personal secrets from unauthorized others by using the user key. Particularly, a mobile disc using a blue-ray disc (BD) or the like provides good mobility due to a size reduction but also has a high possibility of being lost, which increases the need for a restriction of the use of a disc by others.

SUMMARY OF THE INVENTION

The present invention provides a method and apparatus for restricting the use of a disc by an unauthorized third person so as to prevent unauthorized access to personal information and to protect the copyright of data.

According to an exemplary embodiment of the present invention, there is provided a method of restricting the use of a storage medium, the method including reading out lead-in area from a disc when the disc is loaded on a disc drive, reading out a user key from a lead-in area of the disc, and performing authentication of the read-out user key and a user key that is received from a host. The authentication is performed by comparing a random number produced by the disc drive with a random number which is obtained by the drive decrypting a random number encrypted by the host.

The authentication method includes producing a random number in response to a write or read command received from the host and transmitting the random number to the host; encrypting the random number using a user key input by a user and transmitting the encrypted random number from the host to the disc drive; decrypting the encrypted random number, which is received from the host, by using the user key recorded on the disc; and comparing the decrypted random number with the produced random number.

According to an exemplary embodiment of the present invention, there is also provided a method of restricting the use of a storage medium, the method including producing a data key using key production information and a random number, encrypting user data by using the data key, and storing the encrypted user data and the user key in the storage medium. The key production information is extracted from disc information stored in a lead-in area of the storage medium.

According to an exemplary embodiment of the present invention, there is also provided a method of restricting the use of a storage medium, the method including producing a data key using key production information and a random number, encrypting user data by using the data key, encrypting the random number by using the user key, and storing the encrypted user data and the encrypted random number in the storage medium. The key production information is extracted from disc information stored in a lead-in area of the storage medium.

According to an exemplary embodiment of the present invention, there is also provided a method of restricting the use of a storage medium, the method including: receiving a command to read data from and write data to a sector, from a host; determining whether a user key flag has been set in a header of the sector; reading a user key from a lead-in area of the storage medium if the user key flag is 1; and authenticating the read-out user key and a user key that is received from the host.

According to another exemplary embodiment of the present invention, there is provided an apparatus for restricting the use of a storage medium, the apparatus including: a user key extraction portion, which determines whether a user key flag has been set in a lead-in area of the storage medium and extracts a user key from the storage medium if the user key flag is 1; and an authentication portion, which authenticates the extracted user key and a user key that is received from the host.

According to another exemplary embodiment of the present invention, there is also provided an apparatus for restricting the use of a storage medium, the apparatus comprising: an encryption key production portion, which produces a data key by using key production information and a user key; and a data encryption portion, which encrypts user data by using the data key. The key production information is one of a renewal key block, a disc encryption key, a media key, a disc key, a disc identifier, a key production random number, and a disc mode identifier, and a combination of the aforementioned data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

In a disc use restricting method and apparatus according to the present invention, a user key is used as a basis for allowing for a disc access. The user key is electronic information that a user or a disc manufacturer provides to a disc or a reproducing apparatus, and can be implemented as a file, an electric or magnetic storage medium, etc.

Exemplary embodiments of a user key using method according to the present invention include a first method of putting a limitation on the use of a disc reproducing algorithm by using a user key, a second method of directly involving a user key in data encryption, a third method of indirectly involving a user key in data encryption, a fourth method of restricting the use of contents by using a user key.

A disc use restriction method according to a first exemplary embodiment of the present invention will now be described with reference to FIGS. 1 through 4. This disc use restriction method adopts a procedure for authenticating a user key between a disc drive and a host.

Figure 1:
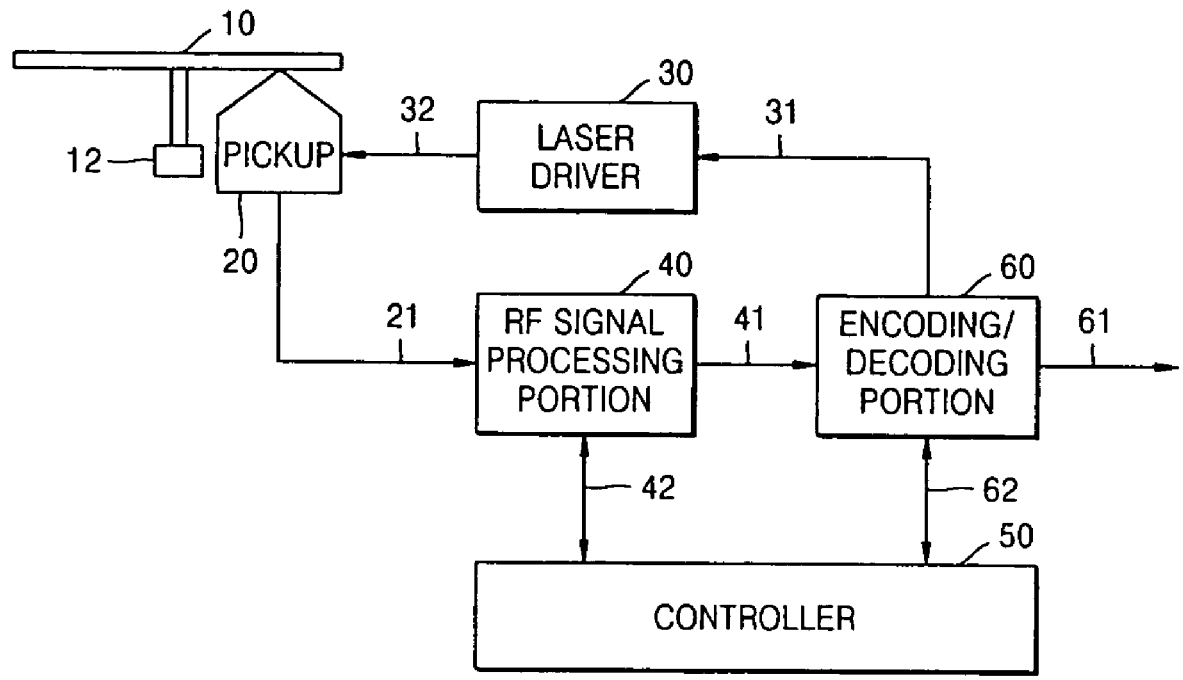
FIG. 1 is a block diagram used for explaining a process of reproducing data on or data from a disc according to an exemplary embodiment the present invention.

FIG. 1 is a block diagram used for explaining a process of reproducing data on or data from a disc according an exemplary embodiment to the present invention. A disc 10 is rotated at a certain linear speed or a certain angular speed by a spindle motor 12. A pickup 20 moves in a radial direction of the disc 10 upon recording and reproduction of data. A signal read out by the pickup 20 is an analog radio frequency (RF) signal 41. An encoding/decoding portion 60 extracts a binary signal 61 from the analog RF signal 41 by using an encoding/decoding algorithm or an encryption/decryption algorithm. A controller 50 controls operations of an RF signal processing portion 40 and the encoding/decoding portion 60 and is implemented as a microcomputer. The controller 50 receives a user input and performs a logic algorithm such as a calculation, a comparison, and the like.

Figure 2:
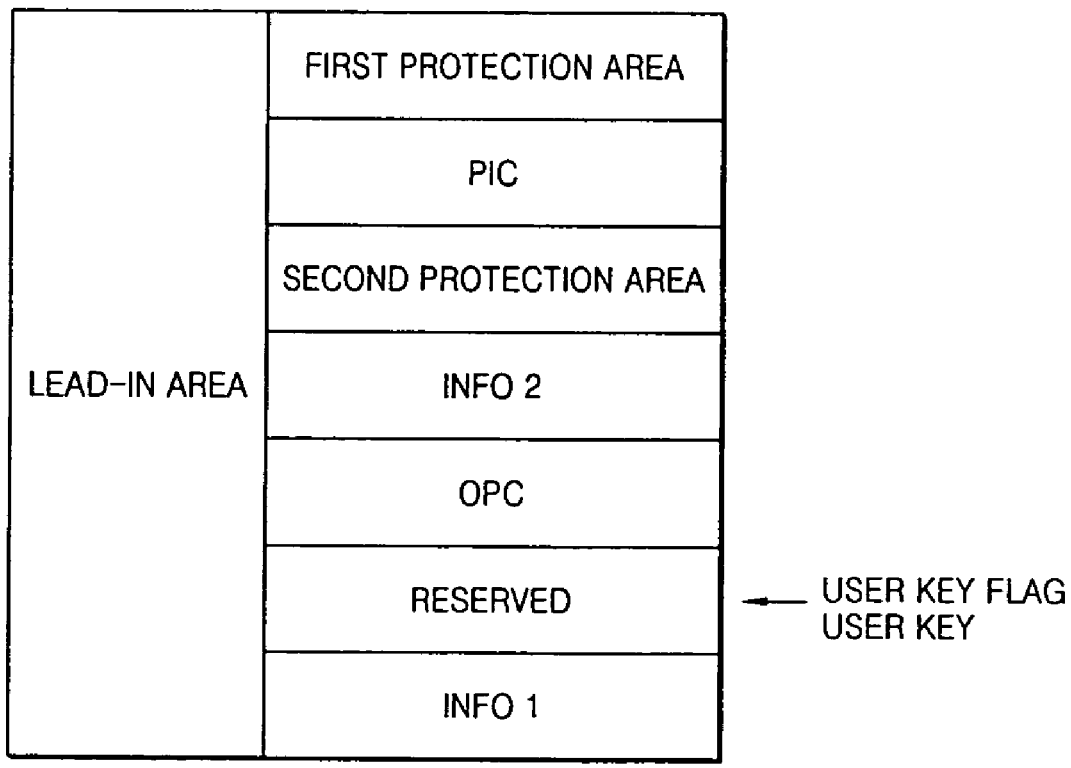
FIG. 2 illustrates a data structure of an optical disc on which a user key has been recorded according to an exemplary embodiment of the present invention.

FIG. 2 illustrates a data structure of an optical disc on which a user key has been recorded according to an exemplary embodiment of the present invention. The optical disc includes a lead-in area, which stores various information about the disc, a data area, which stores user data, and a lead-out area. The user key according to the present invention is stored in the lead-in area. More specifically, the user key may be stored in a reserved area, which is not used in a spec. Also, the optical disc according the exemplary embodiment of the present invention stores a user key flag in the lead-in area. The user key flag indicates whether the user key has been used. If the user key flag is 1, it is determined that the user key has been used. Otherwise, it is determined that the user key has not been used.

Figure 3:
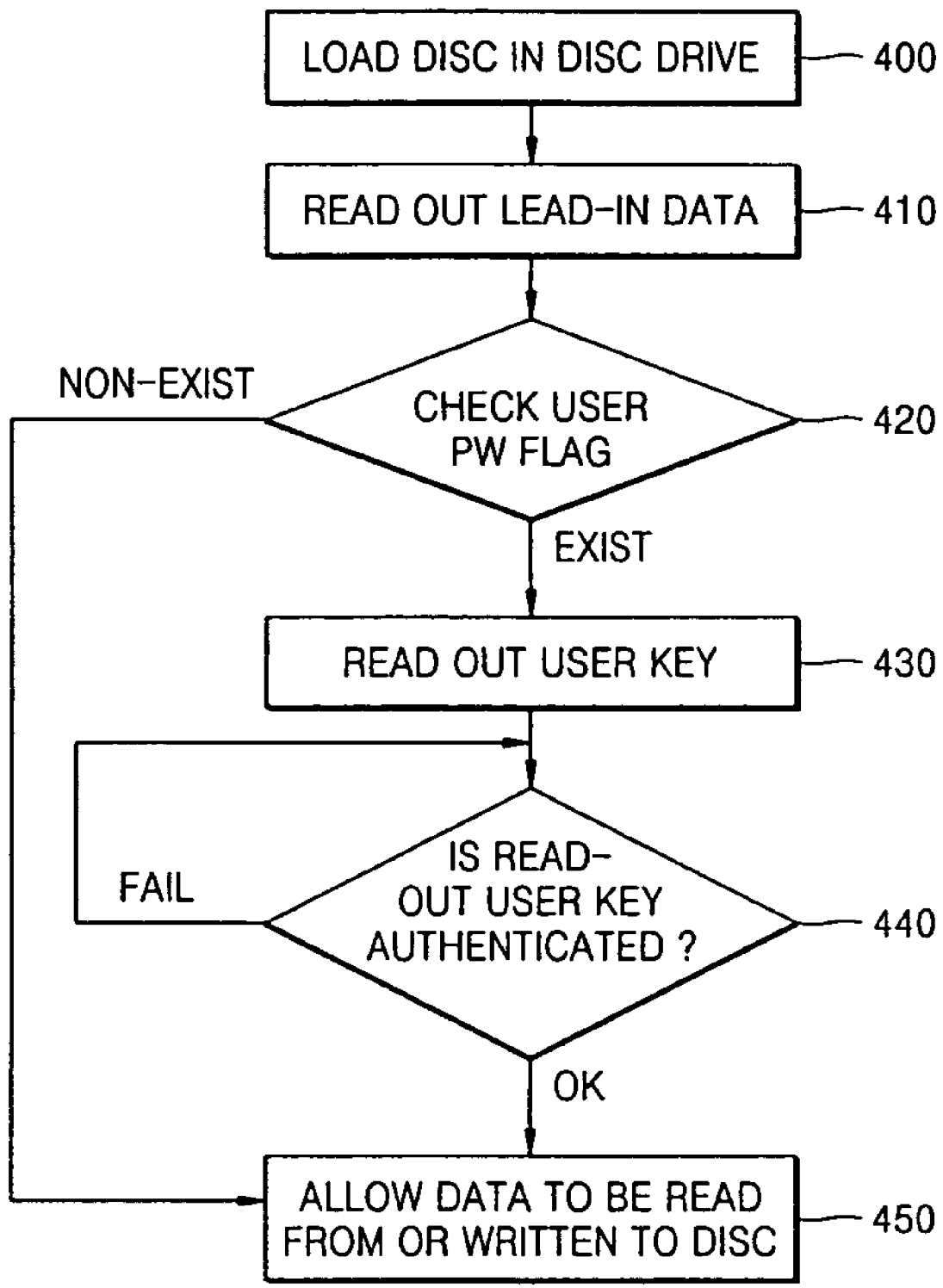
FIG. 3 is a flowchart illustrating a disc use restricting method according to a first exemplary embodiment of the present invention.

FIG. 3 is a flowchart illustrating a disc use restricting method according to a first exemplary embodiment of the present invention. If a disc is loaded in a disc drive in operation 400, the disc drive reads out various information necessary for disc reproduction from a lead-in area of the disc, in operation 410. A user key flag is read out in operation 420. If the user key flag is 1, a user key stored in the lead-in area is read out, in operation 430. If the read-out user key is authenticated in operation 440, the disc drive receives a command for recording/reproducing data on/from the disc and performs disc recording/reproduction, in operation 450.

Figure 4:
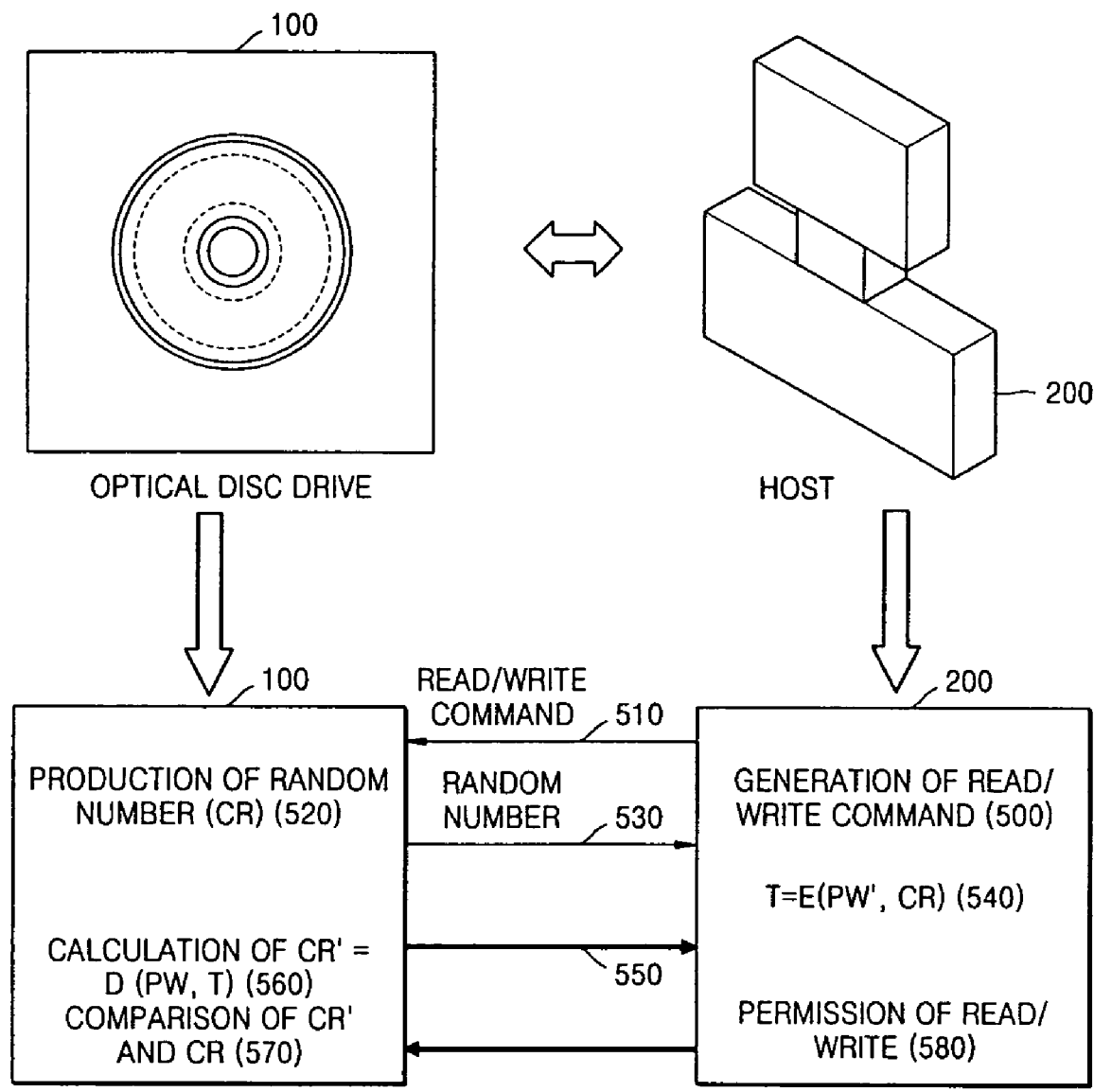
FIG. 4 is a flowchart illustrating an example of a user key authentication procedure in the first exemplary embodiment of FIG. 3.

FIG. 4 is a flowchart illustrating an example of the user key authentication procedure in the first exemplary embodiment of FIG. 3. The user key authentication procedure is a password authentication procedure which is performed between a host 200, which uses a disc reproducing apparatus as a peripheral, and a disc drive 200, which is the disc reproducing apparatus. If the host 200 issues a command to the optical disc drive for recording/reproducing data on/from a particular location on the disc 10 of FIG. 1 in operation 510, the disc drive 100 produces a random number CR and transmits the same to the host 200, in operations 520 and 530. In operation 540, the host 200 produces an encrypted random number T by encrypting the received random number CR using a received user key PW'. In operation 550, the host 200 transmits the encrypted random number T to the disc drive 100. In operation 560, the disc drive 100 produces a decrypted random number CR' by decrypting the encrypted random number T using a user key PW recorded on the disc 10. Thereafter, in operation 570, the disc drive 100 checks if the random number CR is equal to the decrypted random number CR' (or D(PW,T)). If they are equal, the disc drive 100 transmits a control signal, which allows for a read/write operation, to the host 200 and performs the read/write operation, in operation 580.

The user key authentication procedure may be implemented as another method which uses a public key infrastructure. More specifically, if the disc drive 100 has a pair of a public key and a secret key, the host 200 encrypts a user key by using the public key of the disc drive 100 and transmits an encrypted user key to the disc drive 100. The disc drive 100 decrypts the user key using the secret key so as to check if the user key is authentic.

Figure 5:
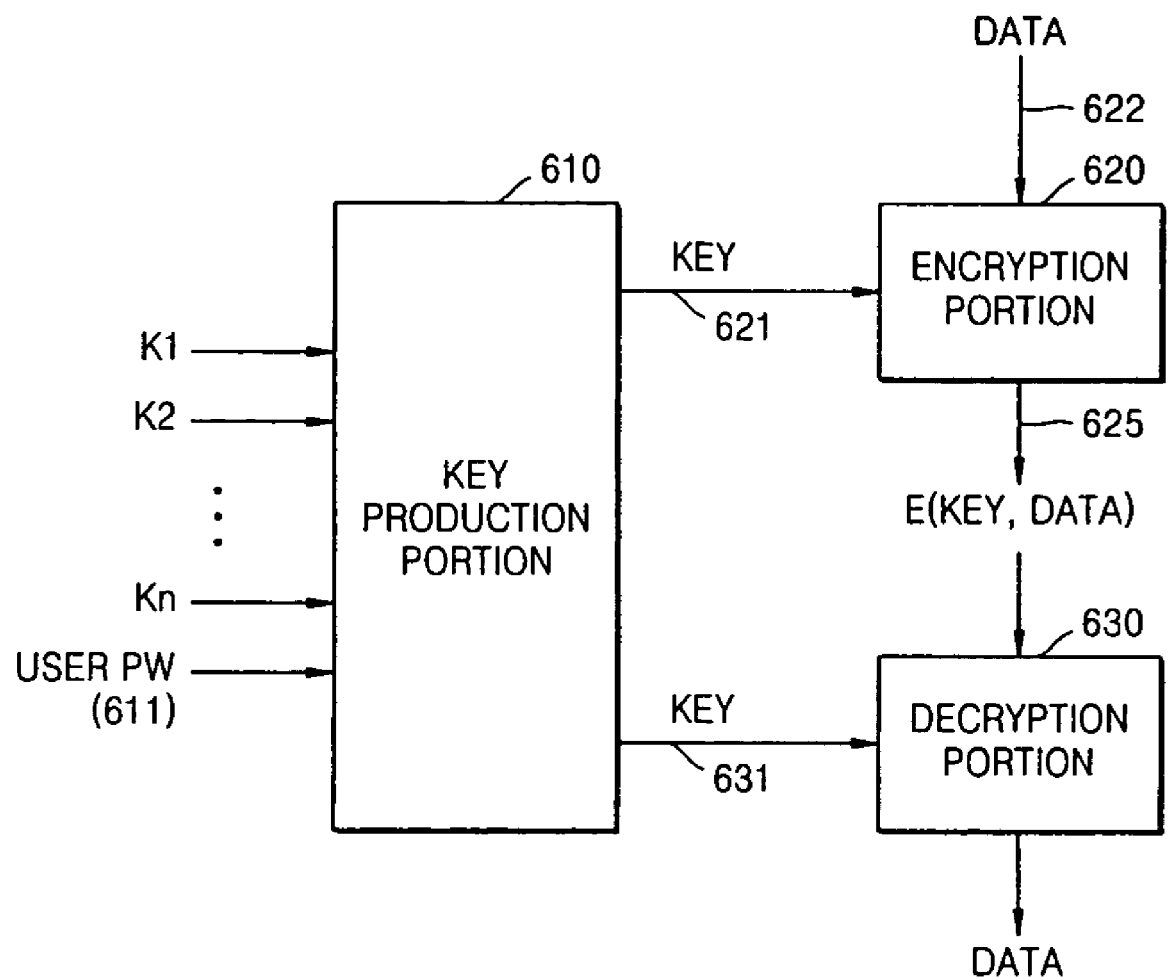
FIG. 5 is a block diagram used for explaining a disc use restricting method according to a second exemplary embodiment of the present invention.

FIG. 5 is a block diagram used for explaining a disc use restricting method according to a second exemplary embodiment of the present invention. Referring to FIGS. 1 and 5, in the second exemplary embodiment, a user key is directly involved in encryption of user data, and the controller 50 includes a key production portion 610, an encryption portion 620, and a decryption portion 630.

Upon recording, the key production portion 610 receives key production information K1, K2, . . . , and Kn and a user key and produces a data key 621. In this case, the user key is a code which is initially set for data storage and input to a disc drive by a user. The encryption portion 620 encrypts user data 622 by using the data key 621, which is received from the key production portion 610, thereby producing encrypted data 625. The encrypted data 625 is stored in the optical disc 10.

Upon reproduction, the key production portion 610 receives key production information K1, K2, . . . , and Kn and a user key and produces a data key 631. In this case, the user key is a code which is input to a disc drive by a user. The authenticity of the input user key has not yet been checked. The pickup 20 reads the encrypted data 625 from the disc 10. The decryption portion 630 decrypts the encrypted data 625 by using the data key 631. If the decryption succeeds, the input user key is authentic. If the decryption fails, the input user key is non-authentic.

Figure 6:
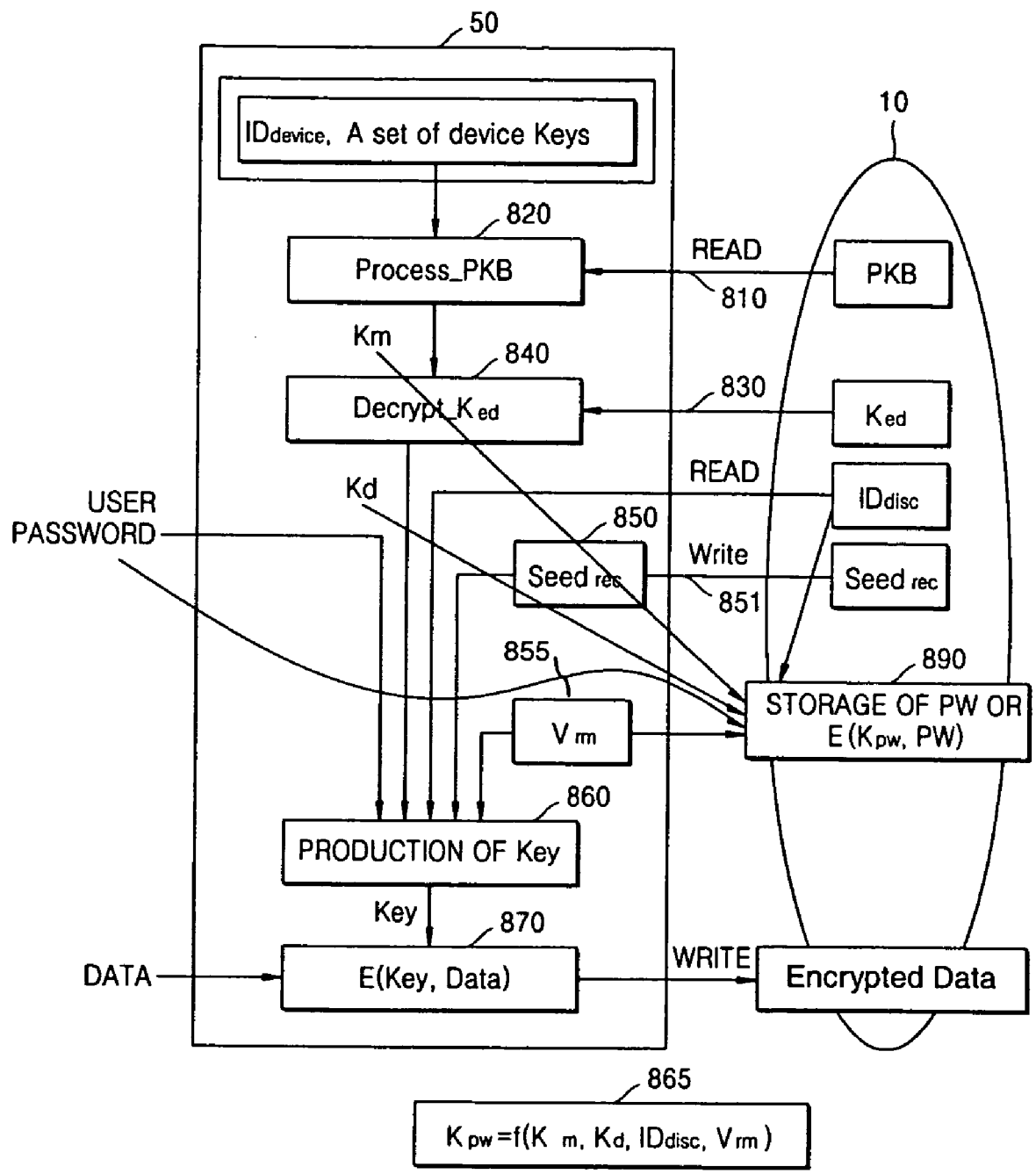
FIG. 6 is a block diagram illustrating an example of a process in which a user key is involved in data key production in the second exemplary embodiment of FIG. 5.

FIG. 6 is a block diagram illustrating an example of a process in which a user key is involved in data key production in the second exemplary embodiment of FIG. 5. The key production portion 610 produces a data key by using key production information K1, K2, . . . , and Kn and a user key PW (operation 860). The key production information includes information stored in a disc 10, information stored in a controller 50, or information that the controller 50 extracts from the information stored in the disc 10. The information stored in the disc 10 includes a renewal key block RKB, a disc encryption key $K_{ed}$, a disc identifier $ID_{disc}$, and the like. The information stored in the controller 50 includes a device identifier $ID_{device}$ and a set of device keys. The information extracted by the controller includes a media key Km, a disc key Kd, a recording random number $Seed_{rec}$, and a mode identifier $V_{rm}$.

First, the controller 50 renews the device keys of the disc drive by using the renewal key block RKB (operation 820), which is read from the optical disc 10 (operation 810), thereby producing the media key Km. Also, the controller 50 decrypts the disc encrypted key $K_{ed}$ by using the media key Km (operation 840). The disc encrypted key $K_{ed}$ is transmitted to the key production portion 610 and involved in key production (operation 860).

Furthermore, the controller 50 produces and stores the recording random number $Seed_{rec}$ in the disc 10 (operations 850 and 851) and transmits the same to the key production portion 610. A device use mode identifier $V_{rm}$ is determined according to a device mode and stored in the optical disc 10 (operation 855).

In an exemplary embodiment of the present invention, a data key is produced, and at the same time, a user key PW used during the data key production is stored in the optical disc 10 (operation 890) in order to solve a problem that may occur during a repair service of the optical disc 10 if a user forgets his or her user key. If an algorithm for encrypting a user key is predetermined, an authorized service provider may repair the optical disc 10 using a predetermined master key that can solve the encryption algorithm.

In another exemplary embodiment of the present invention, the user key PW is encrypted using the aforementioned key production information including Km, Kd, $ID_{disc}$, $V_{rm}$, . . . , and stored in an optical disc (operations 865 and 890). Here, the data included in the key production information may be individually used, or a combination of the data may be used.

Key production, encryption/decryption, random number production, and the like may be performed by a microcomputer and can be represented as separate functional blocks. The key production can be represented as a function determined by an input parameter. The encryption/decryption operation may be represented as a data encryption standard (DES).

Figure 7:
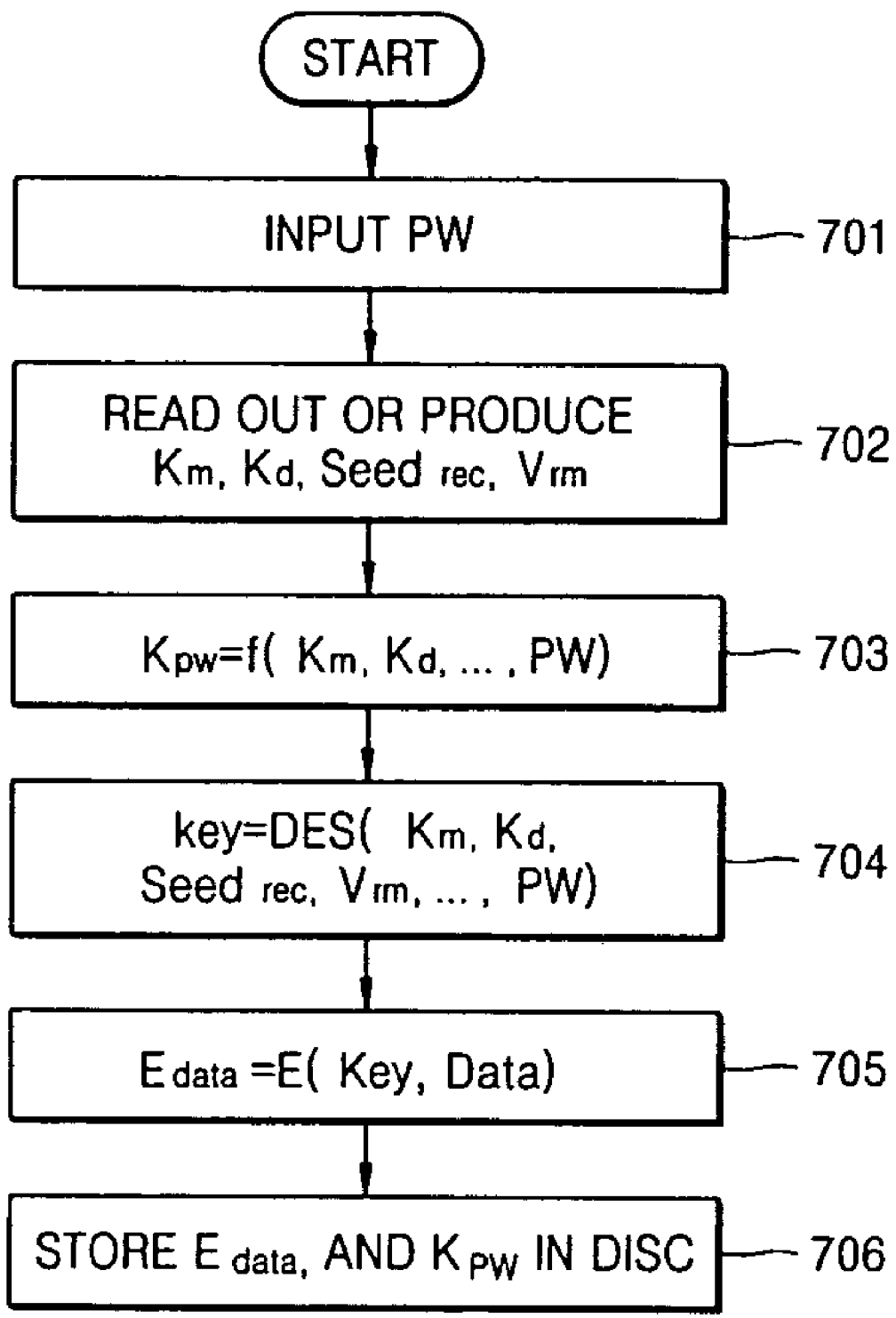
FIG. 7 is a flowchart illustrating the disc use restricting method of the exemplary embodiment of FIG. 5.

FIG. 7 is a flowchart illustrating the disc use restricting method of FIG. 5. In operation 701, a user inputs a user key PW to the controller 50 via a host. In operation 702, a disc drive reads out and produces key production information, such as, a media key Km, a device key Kd, a device identifier $ID_{disc}$, a disc mode $V_{rm}$, . . . , and the like. The media key Km can be produced by renewing a renewal key block stored in a disc and is used in decrypting a disc encryption key $K_{ed}$ stored in the disc. The controller 50 produces the device key Kd by decrypting the disc encryption key $K_{ed}$ using the media key Km. The disc mode $V_{rm}$, which is determined in the controller 50 is transmitted to the key production portion 610. In operation 704, the key production portion 610 produces a data encryption key by using the key production information including Km, Kd, $ID_{disc}$, $V_{rm}$, etc. and the user key PW that is input by the user. At this time, the data encryption standard is used as an encryption algorithm. In operation 705, a disc drive reads out user data and then encrypts the same using the data encryption key. In operation 706, encrypted user data $E_{data}$ and the user key PW are stored in the disc.

In another exemplary embodiment of the present invention, operation 703 of encrypting the user key PW using the key production information is performed prior to operation 704.

Figure 8:
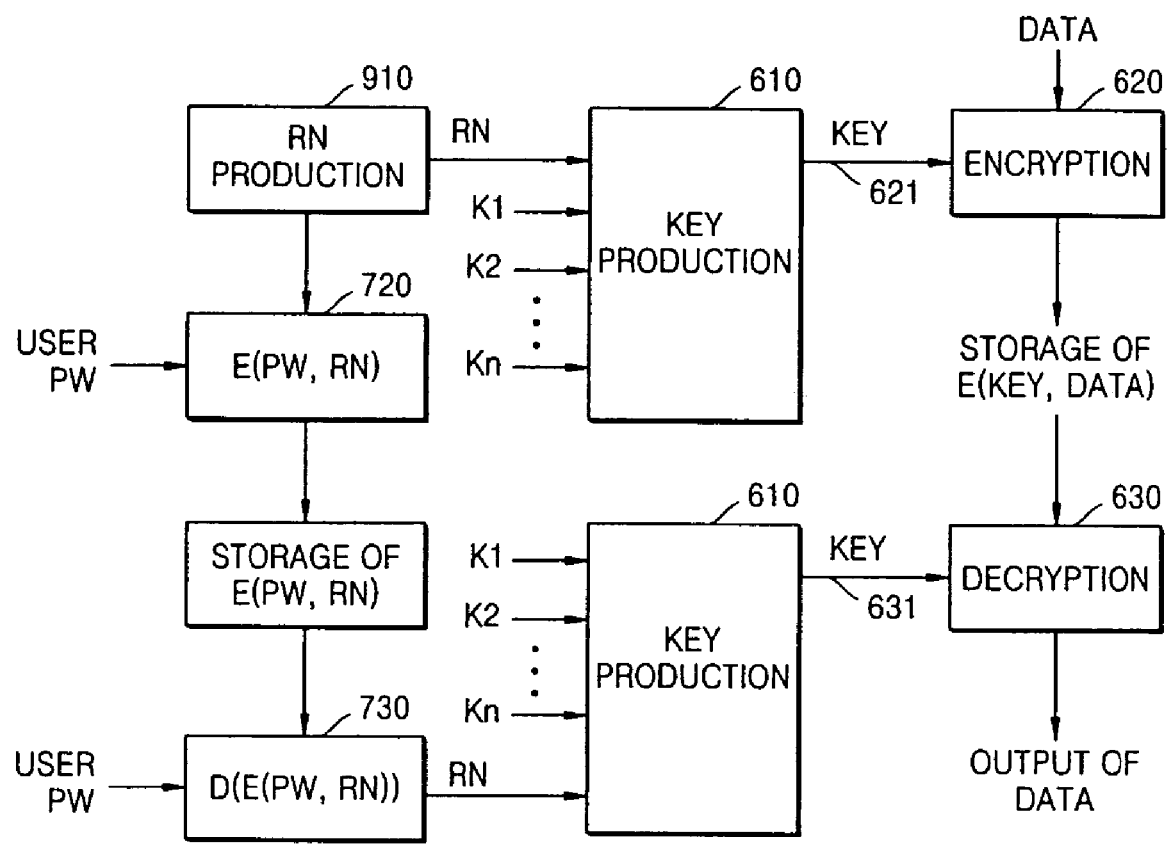
FIG. 8 is a block diagram used for explaining a disc use restricting method according to a third exemplary embodiment of the present invention.

FIG. 8 is a block diagram used for explaining a disc use restricting method according to a third exemplary embodiment of the present invention. In the third embodiment, a user key is indirectly involved in encryption of user data, and the controller 50 of FIG. 1 includes a key production portion 610, an RN production portion 910, an RN encryption portion 720, an RN decryption portion 730, an encryption portion 620, and a decryption portion 630.

Upon recording, the key production portion 610 receives key production information K1, K2, . . . , and Kn and a random number RN and produces a data key 621. In this case, the random number RN is produced by the RN production portion 910. The RN encryption portion 720 encrypts the random number RN by using a user data input by a user, and stores the encrypted random number on a disc. The encryption portion 620 encrypts user data 622 using the data key 621, which is received from the key production portion 610, thereby producing encrypted data 625. The encrypted data 625 is stored in the optical disc 10.

Upon reproduction, a read-out portion (not shown) reads out an encrypted random number E (PW,RN), and the RN decryption portion 730 decrypts the encrypted random number E (PW,RN) by using a user key PW input by a user, thereby producing a random number RN. In this case, the user key PW is a code which is input to a disc drive by a user, and the authenticity of the input user key has not yet been checked. The key production portion 610 receives key production information K1, K2, . . . , and Kn and a random number RN and produces a data key 631. The decryption portion 630 decrypts the encrypted data 625 by using the data key 631. If the decryption succeeds, the input user key is authentic. If the decryption fails, the input user key is non-authentic.

Figure 9:
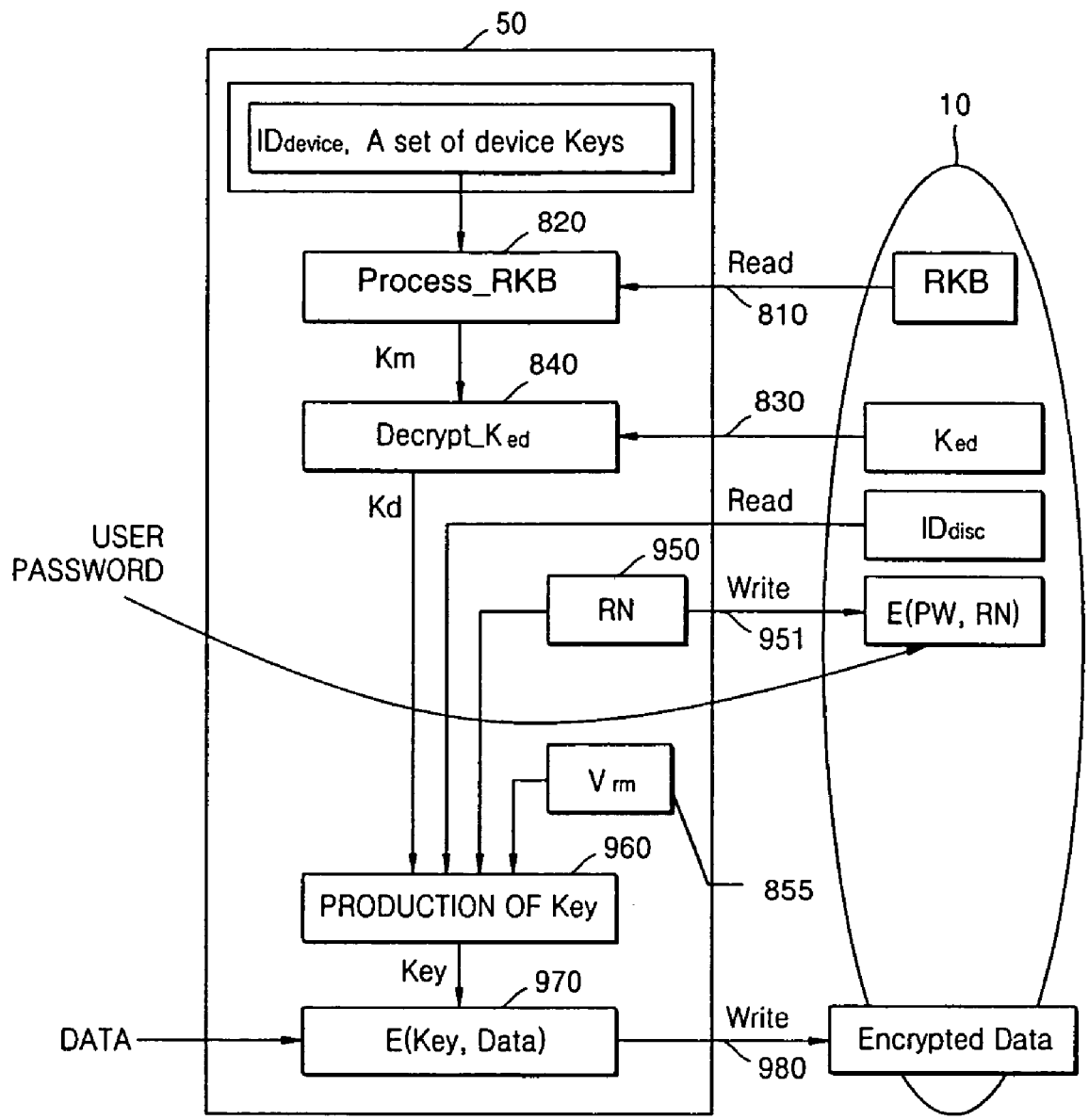
FIG. 9 is a block diagram illustrating an example of a process in which a user key is involved in data key production in the third exemplary embodiment of FIG. 8.

FIG. 9 is a block diagram illustrating an example of a process in which a user key is involved in data key production in the third exemplary embodiment of FIG. 8. Key production information includes information stored in a disc, information stored in a controller, or information that the controller extracts from the information stored in the disc. The information stored in the disc includes a renewal key block RKB, a disc encryption key $K_{ed}$, a disc identifier $ID_{disc}$, and the like. The information stored in the controller includes a device identifier $ID_{device}$ and a set of device keys. The information extracted by the controller includes a media key Km, a disc key Kd, a recording random number Seed$_{rec}$, and a mode identifier V$_{rm}$.

In contrast with the embodiment of FIG. 5, a random number RN used in data key production must be stored in a disc because an RN has a new value every time it is created (operations 950 and 951). In an embodiment of the present invention, a data key is produced, and at the same time, the random number RN is encrypted with a user key and stored on the optical disc 10 (operations 960, 970 and 980).

Since a user key is indirectly involved in data encryption, even an apparatus incapable of receiving a user key can restrict the use of an optical disc. In other words, first, an apparatus that having no keypads, such as, a camcorder, restricts the use of an optical disc by using a random number. Thereafter, if needed, a user inserts the optical disc, which was used in the camcorder, into a computer drive and then sets a user key. Hence, only the user can use the optical disc.

Figure 10:
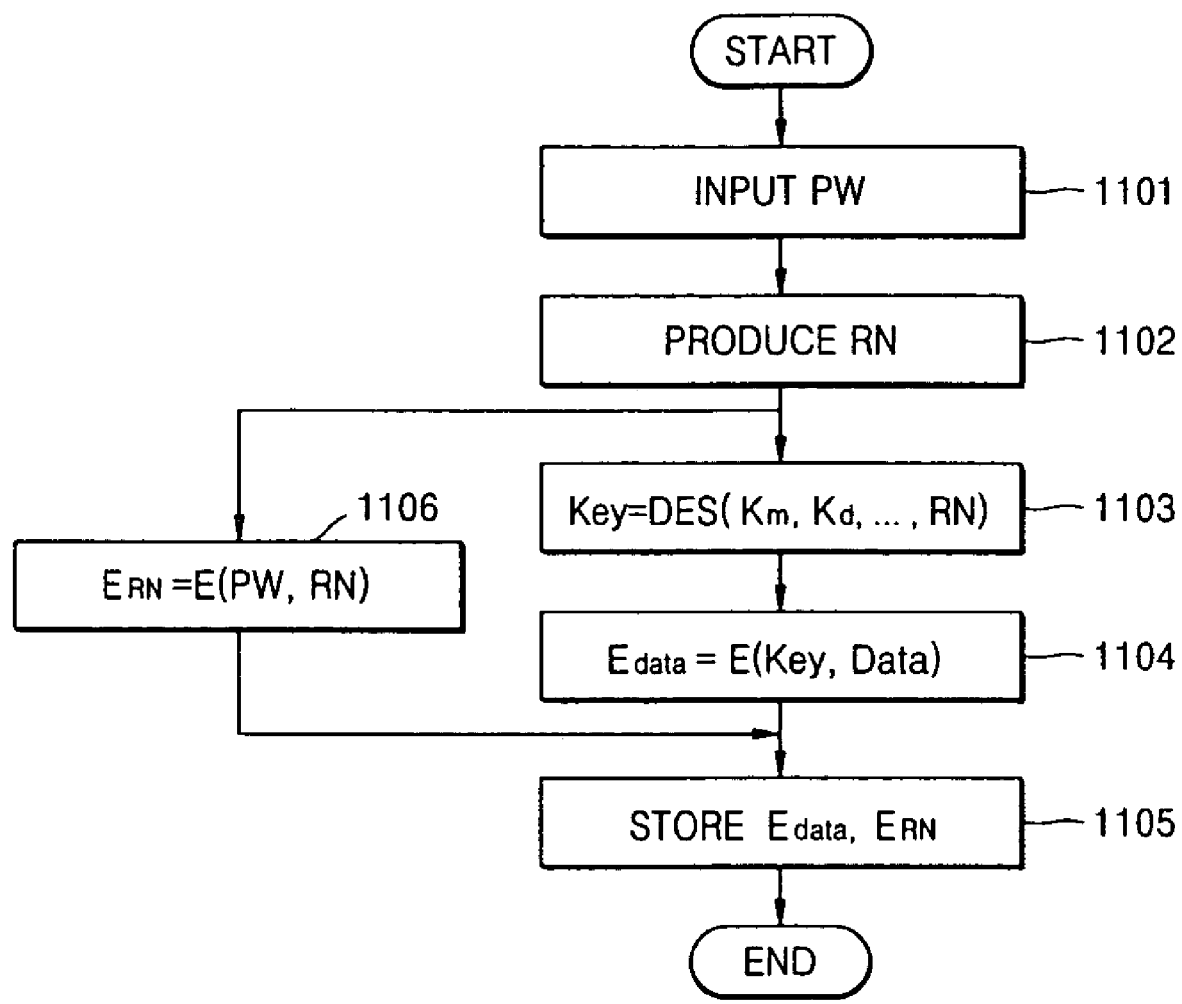
FIG. 10 is a flowchart illustrating a method of recording user data on a disc by using the disc use restricting method of the exemplary embodiment of FIG. 8.

FIG. 10 is a time flowchart illustrating a method of recording user data on a disc by using the disc use restricting method of FIG. 8. Referring to FIGS. 8 and 10, in operation 1101, a user inputs a user key PW to a disc drive. In operation 1102, the RN production portion 910 produces a random number RN. In operation 1103, the key production portion 610 produces a data encryption key using key production information and the random number RN. The key production information is produced and read-out in the same method as in the embodiment of FIG. 5. In operation 1105, the data encryption portion 620 encrypts user data using the data encryption key and stores the encrypted user data on the disc. In operation 1106, the RN encryption portion 720 encrypts the random number RN by using the user key PW. Thereafter, in operation 1105, an encrypted random number E$_{RN}$ is stored in the disc. In contrast with the embodiment of FIG. 5, the random number RN used in data key production must be stored in the disc because the value of the RN varies every time the data key production.

Figure 11:
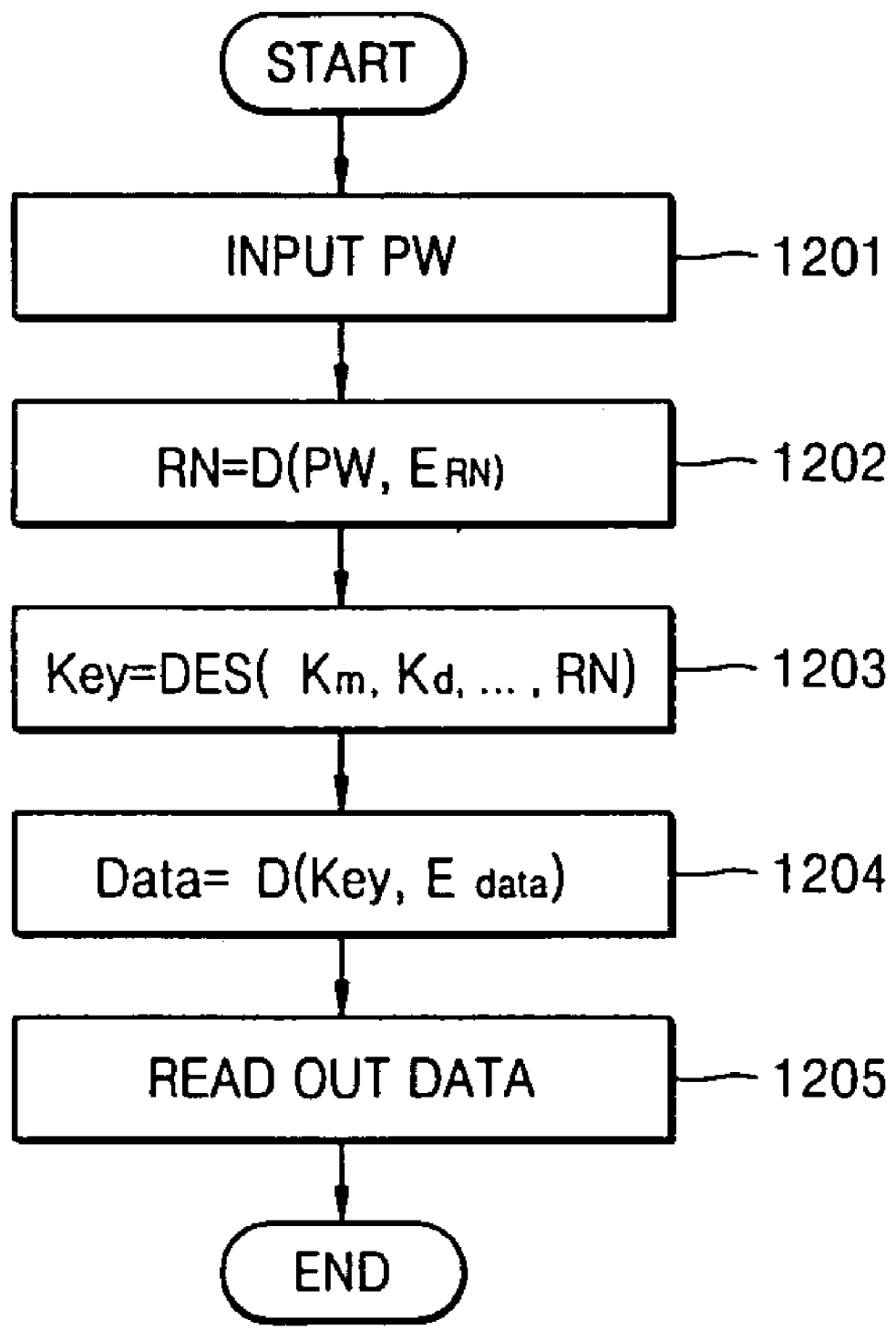
FIG. 11 is a flowchart illustrating a method of reproducing user data from a disc by using the disc use restricting method of the exemplary embodiment of FIG. 8.

FIG. 11 is a time flowchart illustrating a method of reproducing user data from a disc by using the disc use restricting method of FIG. 8.

In operation 1201, a user inputs a user key PW' to a disc drive via a host. In operation 1202, the RN decryption portion 730 reads out the encrypted random number E$_{RN}$ from the disc and decrypts the same using the input user key PW', thereby producing a random number RN'. In operation 1203, the key production portion 610 produces a data key Key' by using key production information and the random number RN'. In operation 1204, the data decryption portion 630 decrypts user data by using the data key Key'. If the user key PW' is authentic, the random number RN' is also authentic. The data key Key' is also the same as the data key Key which encrypts the contents. Hence, if the user key input by the user is authentic, that is, PW=PW', the user data will be decrypted and successfully read-out by the host, in operation 1205.

Figures 12, 13:
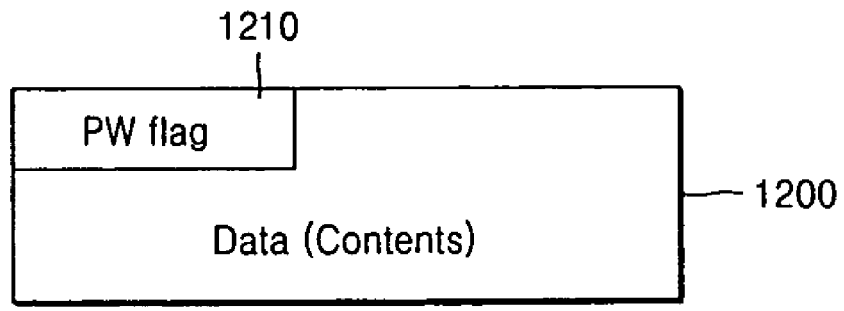
FIG. 12 illustrates a sector structure of an optical disc according to a fourth exemplary embodiment of the present invention.
FIG. 13 illustrates a use restriction list, which represents contents whose use is restricted.

FIG. 12 illustrates a sector structure of an optical disc according to a fourth exemplary embodiment of the present invention. In the fourth embodiment of the present invention, the use of only user data of necessary contents by others is restricted. A disc use restricting method used in the fourth embodiment adopts the above-described first and fourth methods of using a user key.

The disc use restricting method according to the fourth exemplary embodiment does not relate to data encryption. When a user writes contents, a user key flag indicating that a user is restricted in using the written contents is set. The disc use restricting method according to the fourth embodiment is different from that of FIG. 1 in that the user key flag is not set in a lead-in area of a disc but in a header of contents. If a host issues a command to read data from or write data to a contents sector, a disc drive checks a user key flag set in the contents sector and determines if the read or written data are contents in which a user key has been set. If the read or written data are contents in which a user key has been set, the disc drive performs a user authentication procedure as described in the first embodiment. If the user authentication procedure succeeds, the disc drive executes the read or write command issued by the host. If the user authentication procedure fails, the disc drive refuses the read or write command. The user key is set in the same manner as illustrated in FIG. 2.

FIG. 13 illustrates a use restriction list, which includes contents whose uses are restricted. The unit in which the use of a content is restricted may vary. If the unit is not a sector, a use restriction list which can indicate whether a user key has been set in a content is needed. The use restriction list can be located in a protection area of a lead-in area of an optical disc. A use restriction identifier (SID) denotes a serial number of contents whose uses are restricted among contents stored in a data area of the optical disc. The contents have identifiers C1, C2, . . . , and an address of a sector in which each content is located is included in the use restriction list.

When a host issues a contents read or write command, the contents read or write command including a sector that exists in the use restriction list undergoes an authentication procedure as described above.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to a disc use restricting method of the present invention, the use of a disc by an unauthorized third person is restricted, thus preventing unauthorized access to personal information and a protection of the copyrights of data.

The present invention is applicable to a method and apparatus for preventing accesses to a storage medium by unauthorized users.

What is claimed is:

1. A method of restricting use of a storage medium, the method comprising:
   producing a data key using key production information and a random number;
   encrypting user data by using the data key to generate encrypted data;
   encrypting the random number by using a user key to generate an encrypted random number; and
   storing the encrypted user data and the encrypted random number in the storage medium,
   wherein the key production information is extracted from disc information stored in a lead-in area of the storage medium.

2. The method of claim 1, wherein the key production information comprises at least one of a renewal key block, a disc encryption key, a media key, a disc key, a disc identifier, a key production random number, and a disc mode identifier.

3. The method of claim 1, further comprising:
   decrypting the random number by using a user key input by a user;

producing the data key by using the random number and the key production information; and decrypting the encrypted user data by using the data key.

4. A method of restricting use of a storage medium, the method comprising:

receiving, from a host, a command to read data from or write data to a sector;

determining whether a user key flag has been set in a header of the sector;

reading a first user key from the storage medium if the user key flag is set to 1; and authenticating the first user key and a second user key that is received from the host, wherein the authenticating step comprises:

producing a random number and transmitting the random number to the host if the command to write or read data is received from the host;

encrypting the random number by using the second user key and transmitting an encrypted random number to a storage medium drive;

decrypting the encrypted random number by using the first user key recorded on the storage medium; and comparing a decrypted random number with the random number which is produced.

5. The method of claim 4, wherein the authenticating step further comprises:

providing a pair of a public key and a secret key to the storage medium drive;

encrypting the second user key by using the public key and transmitting an encrypted user key to the storage medium drive; and decrypting the encrypted user key by using the secret key in the storage medium drive.

6. An apparatus for restricting use of a storage medium, the apparatus comprising:

a user key extraction portion, which determines whether a user key flag has been set in a lead-in area of the storage medium and extracts a first user key from the storage medium if the user key flag is set to 1; and an authentication portion, which authenticates the first user key and a second user key that is received from the host, wherein the authentication portion comprises:

a random number production portion, which produces a random number, stores the produced random number in the storage medium, and transmits the random number to the host, when a write or read command is received from the host;

a random number decryption portion, which receives an encrypted random number obtained using the second user key from the host and decrypts the encrypted random number by using the first user key recorded on the storage medium; and a comparator, which compares a decrypted random number with the random number.

7. The apparatus of claim 6, wherein the authentication portion performs authentication using a public key infrastructure (PKI).

8. An apparatus for restricting use of a storage medium, the apparatus comprising:

an encryption key production portion, which produces a data key by using key production information and a user key;

a random number production portion, which produces a random number when the host issues a write or read command, wherein the encryption key production portion produces an encryption key by using the key production information and the random number;

a data encryption portion, which encrypts user data by using the data key;

a random number encryption portion, which encrypts the random number by using the user key and stores an encrypted random number to the storage medium;

a random number decryption portion, which decrypts the random number by using the user key input by the user;

a decryption key production portion, which produces a data decryption key by using the random number and the key production information; and a data decryption portion, which decrypts the user data by using the decryption key, wherein the key production information comprises at least one of a renewal key block, a disc encryption key, a media key, a disc key, a disc identifier, a key production random number, and a disc mode identifier.

9. The apparatus of claim 8, further comprising a user key encryption portion, which encrypts the user key by using the key production information.

* * * * *

UNITED STATES PATENT AND TRADEMARK OFFICE
CERTIFICATE OF CORRECTION

PATENT NO. : 7,590,865 B2  Page 1 of 1
APPLICATION NO. : 10/953579
DATED : September 15, 2009
INVENTOR(S) : Han et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1325 days.

Signed and Sealed this

Twenty-first Day of September, 2010

David J. Kappos
*Director of the United States Patent and Trademark Office*